Dec. 16, 1924.
S. A. CRONE
1,519,759
RAILWAY BRAKE BEAM
Filed Feb. 11, 1924    2 Sheets-Sheet 1
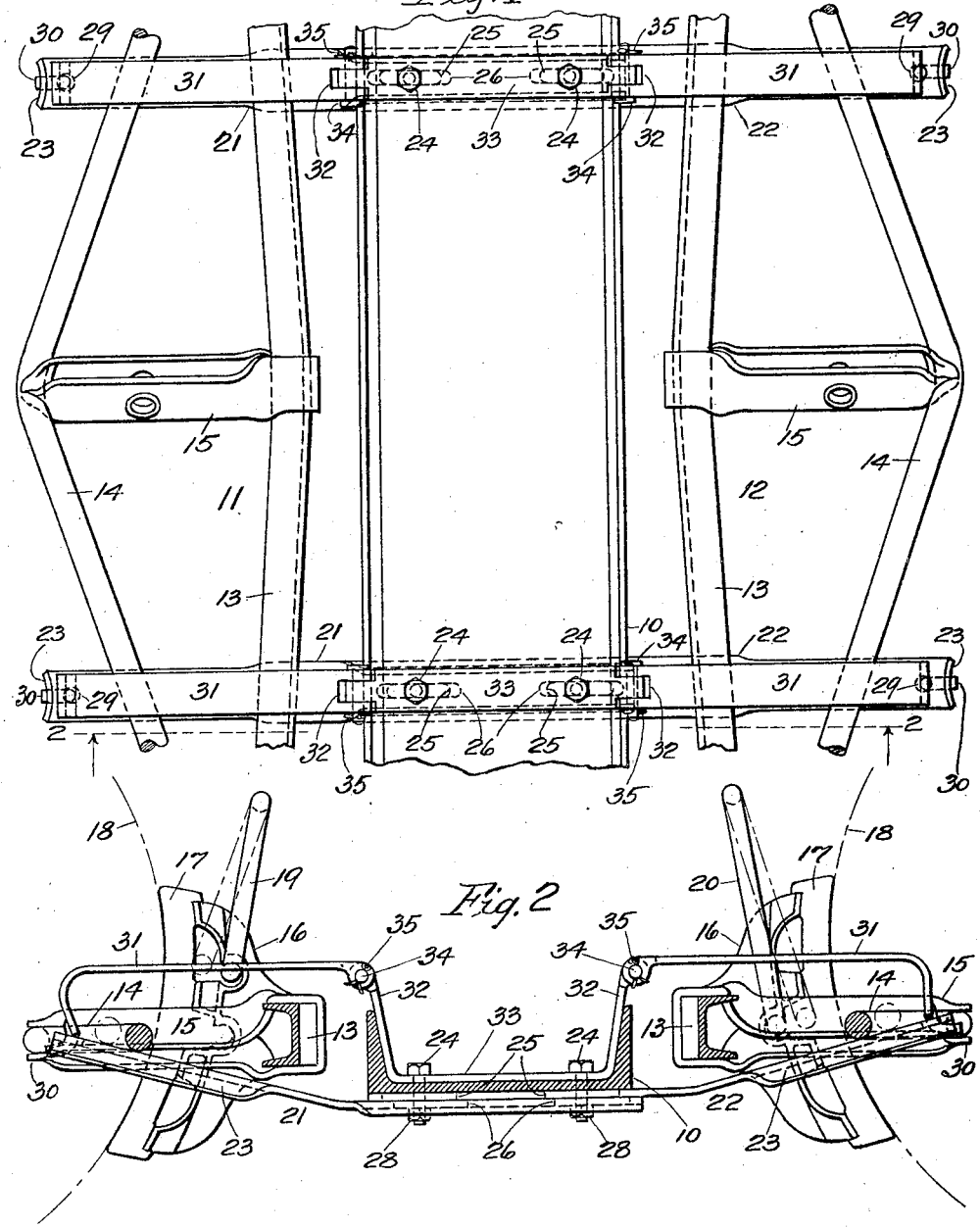
INVENTOR
Seth A. Crone
BY
ATTORNEY

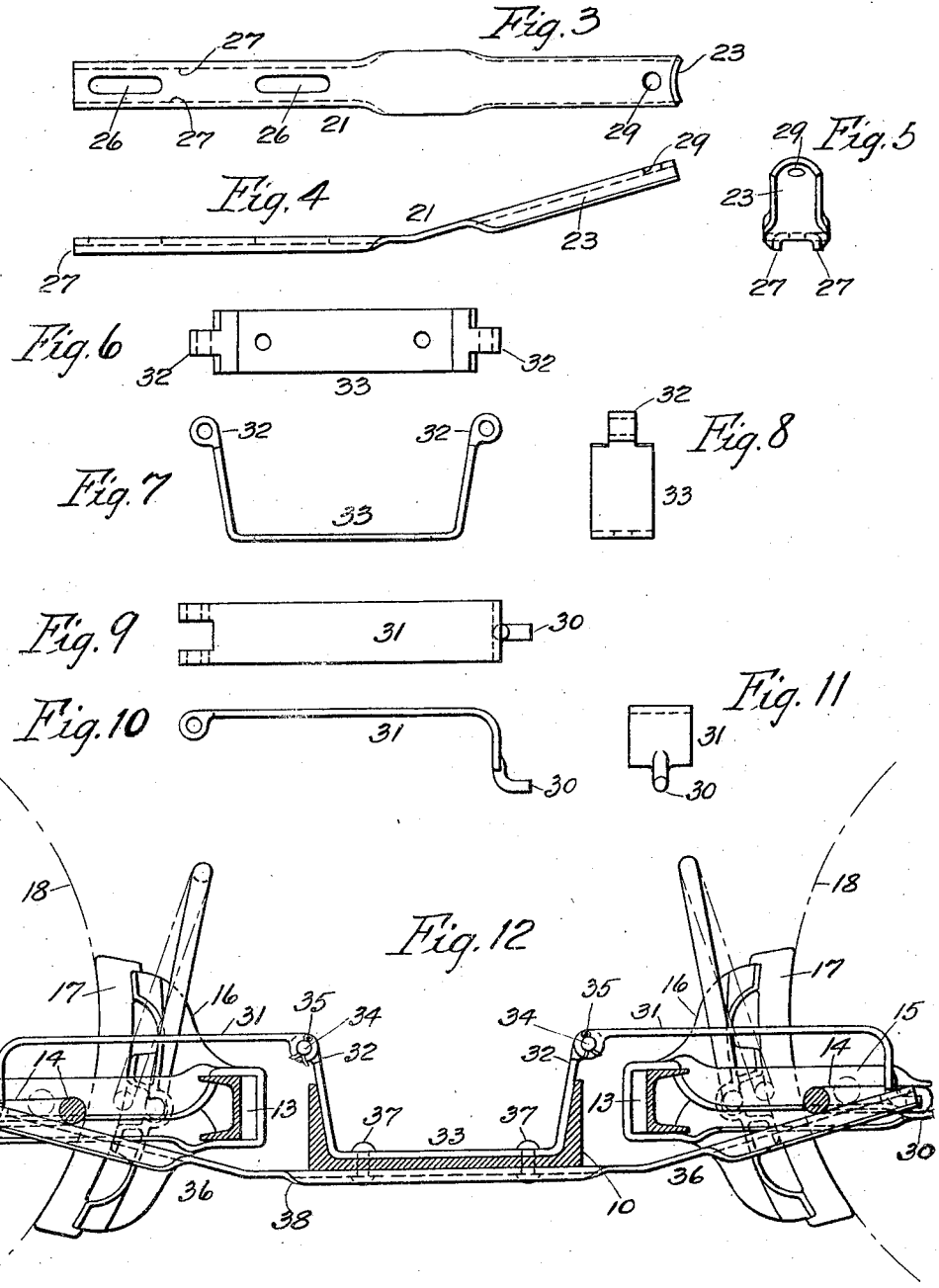

Patented Dec. 16, 1924.

1,519,759

UNITED STATES PATENT OFFICE.

SETH A. CRONE, OF EAST ORANGE, NEW JERSEY.

RAILWAY BRAKE BEAM.

Application filed February 11, 1924. Serial No. 691,888.

*To all whom it may concern:*

Be it known that I, SETH A. CRONE, a citizen of the United States, and a resident of East Orange, in the county of Essex and State of New Jersey, have invented certain new and useful Improvements in Railway Brake Beams, of which the following is a specification.

The invention pertains to railway brake beams and particularly to a four point suspension therefor and means cooperating with the respective tramway-bar members of the four point suspension for holding the beam captive, while at the same time permitting the beam to have its requisite movements in the service application of the brakes to and their release from the car wheels.

Another feature of the invention is the provision of longitudinally adjustable four point suspension tramway-bars so as to adapt the same to the varying conditions which arise when the bars are applied to trucks whose brake beam hangers vary in length or are not of the same length at both ends of the truck or differ in length on the different trucks to which the tramway bars are to be applied.

Another feature of the invention is the combining with four point suspension tramway bars, of yielding detachable links extending over said bars and connected with the outer ends thereof and to a part of the truck, for the purpose of preventing, in the event of accident to the beam hanger or hangers the end of the beam from slipping over the outer end of the bar and also preventing on the service application of the brakes, the wheels from causing the brake shoe at the disabled end of the beam, to ride unduly upward on the wheel. The ends of the beam are, in my invention, held captive between the tramway bars and the overhead links and thereby the beam, in case of accident to the hangers, can neither fall to the roadbed or be carried upwardly over the wheels.

I present my invention herein as applied to certain features shown and described in Letters Patent No. 1,475,280 granted to me on November 27, 1923, but my invention is obviously applicable to the tramway bars of various well known four point suspension mechanisms, and therefore the essential features of the invention are not limited, in every instance, to all the details of the tramway bars shown in the drawings.

The invention will be fully understood from the detailed description hereinafter presented, reference being had to the accompanying drawings, in which:

Fig. 1 is a plan view, partly broken away, of a car truck frame and two inside hung brake-beams, said truck frame being provided with the four point suspension and safety features of my invention;

Fig. 2 is a vertical longitudinal section through the same taken on the dotted line 2—2 of Fig. 1; Fig. 2 illustrates two different lengths of brake-beam hangers to indicate the applicability of the invention for brake-beams whose heads are centrally hung or hung from their upper end portions;

Fig. 3 is a detached plan view of one lower tramway-bar, being the left hand bar looking at Fig. 2;

Fig. 4 is a side view and Fig. 5 an end projection of the same;

Fig. 6 is a plan view, Fig. 7 a side elevation and Fig. 8 an end projection of a bearing-frame I secure upon the spring plank of the truck to receive the inner ends of the retaining links whose outer ends are detachably connected with the outer ends of the tramway bars;

Fig. 9 is a plan view, Fig. 10 a side elevation and Fig. 11 an end projection of one of the aforesaid retaining links, and Fig. 12 is a longitudinal section, corresponding with Fig. 2, showing the end hangers for the brake beams of corresponding length and the tramway bars in one piece extending beyond both side edges of the spring plank, as distinguished from said bars being in separate pieces and adjustable longitudinally to meet conditions arising from the use of different kinds of brake-beam hangers, as shown in Fig. 2;

In the drawings 10 designates a portion of a customary spring-plank constituting a portion of a car-truck frame, and 11, 12 denote trussed brake-beams of known form each comprising a compression member 13, a tension member or truss rod 14 and a strut 15 adapted to take the usual brake lever not shown. On the ends of the beams 11, 12 are the usual brake-shoe heads 16 carrying shoes 17 for application to the wheels 18. The heads 16 are suspended by swiveled hangers numbered 19, 20, respectively in Fig. 2, the hanger 19 being less in length than the hanger 20 and connected with the upper portion of its head 16 in a customary way, while the hanger 20 engages its head 16 at about the center thereof, as usual. I illustrate the two different lengths of hangers 19, 20 to indicate the value of one feature of my invention hereinafter described, relating to the relative adjustability of the tramway bars 21, 22.

The tramway bars 21, 22 provide two means of suspension for the brake beams in addition to the two means of suspension afforded by the hangers, and these bars incline upwardly at each side of the spring plank, as usual, and, in the illustration of my invention presented herein, have convex upper end surfaces, as at 23, to receive the end portions of the truss rods 14, in the manner and for the purposes described in my aforesaid Letters-Patent.

The tramway-bar 22 has a flat inner end which is secured against the lower face of the spring plank 10 by bolts 24, which extend through the inner ends of both bars 21, 22 and said plank 10, said ends of said bars being formed with longitudinal slots 25, 26 respectively to receive said bolts and permit of the longitudinal adjustment of said bars or of either bar to suit the requirements of the beam-hangers, the beams or other conditions that may arise. The inner end of each tramway bar 21 is flanged downwardly at its side edges, as at 27, whereby the strength and rigidity of said end are greatly increased. The nuts 28 for the bolts 24 lie between the flanges 27 and firmly engage the lower surface of the inner end of the bar 21 and bind the upper surface of said end against the adjacent portion of the bar 22 and adjustably secure both bars to the spring plank 10. Upon loosening the nuts 28, either or both pairs of bars 21, 22 or any one or more of the four bars may be adjusted longitudinally to bring the proper portion of the upper surfaces of the bars into correct relation to the end portions of the truss rods 14, the bars 21, 22 thus being rendered adjustable to the truss rods and to meet such conditions as may be found in variations of beam-hangers and trucks.

The operation of the tramway bars 21, 22 and the general benefits to be derived from their use, are fully explained in my aforesaid Letters Patent, wherein, however, the bars lack the feature of adjustability hereinbefore described and which is of special benefit in applying the bars to car trucks not specially built to receive four point suspension bars.

The outer ends of the bars 21, 22 are apertured, at 29, to receive the longitudinally extending outwardly projected hook-fingers 30 (Figs. 8, 9, 10) on the outer ends of link-bars 31 which are above and in vertical alignment with the tramway bars and also over the end portions of the brake beams 11, 12, and are hinged at their inner ends to the upper ends 32 of the sides of U-shaped bearing frames 33 seated within the top of the spring plank 10 and firmly secured thereto by the aforesaid bolts 24, there being two of the frames 33 and a bar 31 above each tramway bar.

The tramway bars 21, 22 may yield downwardly during the service application of the brakes and upwardly on the release of the brakes to accommodate the arcs described by the lower ends of the brake-hangers, and hence I hinge the inner ends of the link-bars 31 and so articulate the outer ends of said bars with the outer ends of the tramway bars that the link bars and tramway bars may yield or move together without becoming disconnected or straining the parts. The pintles 34 for the hinges at the inner ends of the bars 31 have heads on one end and at the other end are detachably held in operative position by cotter-keys 35. In assembling the link-bars 31 with the tramway bars, said link-bars 31 being free of the truck, I project the fingers 30 of the bars 31 downwardly through the holes 29 in the ends of the tramway bars and then turn the inner ends of the bars 31 to the upper ends 32 of the frames 33 and secure said ends of the bars 31 to said ends 32 by the application of the pintles 34 and cotter keys 35. The body-portions of the link-bars 31 are substantially straight and horizontal, and at their outer ends said bars extend downwardly to the outer ends of the tramway bars 21, 22, respectively, and therefore each tramway bar and its cooperating link-bar 31 define a safety loop encompassing an end portion of the brake-beam.

The link-bars 31 may be readily removed, when desired, by first withdrawing the cotter-keys 35 and pintles 34 and then turning the bars upwardly and outwardly to retract the fingers 30 from the holes 29 in the tramway bars. The link-bars 31 may be readily applied to and withdrawn from operative position and this is a consideration of practical advantage.

The link-bars 31 serve to prevent, in the event of accident to the brake hangers, the escape of the beam or of an end thereof over the outer end of the tramway bars and also to prevent a car wheel from carrying the end of a disabled beam upwardly over the wheel on a service application of the brakes.

In Fig. 12, I illustrate the tramway bars 36 at each side of the spring plank 10 as made from one integral strip of steel whose middle portion is secured to the spring plank by rivets 37 and is flanged downwardly at its opposite side edges, as at 38, said flanges 38 corresponding with the flanges 27 of the bar 21. The tramway bars 36 by being made in one piece lack the feature of adjustability possessed by the construction shown in Fig. 2. The construction shown in Fig. 12 is the same as that shown in Fig. 2 with the exception of the tramway bars 36 being made from one piece of material, and hence the details of Fig. 12 need not be further described. I have applied on Fig. 12 the same reference numerals used in Fig. 2 to indicate parts already described and common to both constructions.

What I claim as my invention and desire to secure by Letters Patent, is:

1. A trussed brake-beam, an inclined tramway suspension-bar therefor and a yielding member over said bar and beam for confining the beam, said member being articulated to an inner truck member and thence extending outwardly and to said bar and being articulated at its outer end thereto.

2. A trussed brake-beam, inclined tramway suspension bars for the end portions thereof and yielding members over said bars and beam for confining the beam, said yielding members being articulated to inner truck members and thence extending outwardly and to said bars and being articulated at their outer ends thereto.

3. A trussed brake-beam, an inclined tramway suspension-bar therefor and a yielding member over said bar and beam for confining the beam, said member being detachably hinged at its inner end to a stationary truck member and thence extending outwardly and to said bar and being detachably connected at its outer end thereto.

4. A trussed brake-beam, inclined tramway suspension-bars for the end portions thereof and yielding members over said bars and beam for confining the beam, said yielding members being detachably hinged at their inner ends to stationary truck members and thence extending outwardly and to said bars and being detachably connected at their outer ends thereto.

5. A trussed brake-beam, inclined tramway suspension bars for the end portions thereof and yielding members over said bars and beams for confining the beam, said yielding members being detachably hinged at their inner ends to stationary truck members and thence extending outwardly and to said bars and being detachably connected at their outer ends thereto by means comprising holes in the ends of said bars and forwardly deflected fingers on the outer ends of said yielding members and entered within said holes.

6. A trussed brake-beam, inclined tramway suspension-bars for the end portions thereof and yielding members over said bars and beam for confining the beam, said yielding members being articulated to inner truck members and thence extending outwardly and to said bars and having a yielding connection at their outer ends therewith.

7. The combination in a car-truck of two inside-hung trussed brake-beams, two inclined tramway suspension-bars at each side of the spring plank for the end-portions of said beams, frames seated in said spring plank having upwardly extending arms and beam retaining members above said bars and beams and articulated at their inner ends to said arms and at their outer ends to said bars.

8. A trussed brake-beam, inclined tramway suspension-bars for the end portions thereof and longitudinally extending beam retaining bars above said suspension-bars and beam and at their outer ends having a detachable yielding connection with the outer ends of said suspension bars.

9. A trussed brake-beam, inclined tramway suspension-bars for the end portions thereof and longitudinally extending beam retaining bars above said suspension-bars and beam and at their outer ends being connected with the outer ends of said suspension-bars and at their inner ends being hinged to yield downwardly with the suspension-bars.

Signed at New York city, in the county of New York and State of New York, this 9th day of February A. D. 1924.

SETH A. CRONE.